2 Sheets—Sheet 1.

J. W. MALOY.
Machine for Molding and Surfacing Stone.

No. 213,828. Patented April 1, 1879.

Witnesses
Chas. F. Sleeper,
J. E. Knox

Inventor:
James W. Maloy
by J. E. Maynadier
his atty

N. PETERS, PHOTO-LITHOGRAPHER, WASHINGTON, D. C.

J. W. MALOY.
Machine for Molding and Surfacing Stone.
No. 213,828. Patented April 1, 1879.
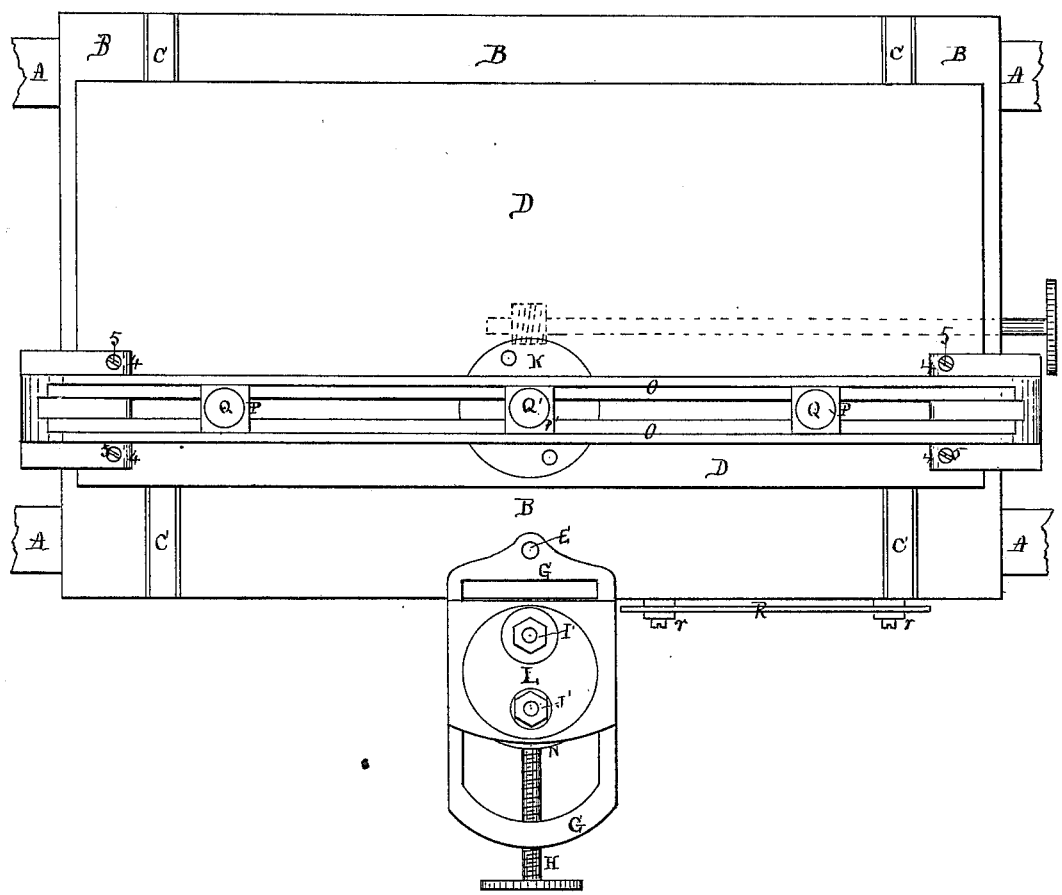

UNITED STATES PATENT OFFICE.

JAMES W. MALOY, OF SOMERVILLE, ASSIGNOR TO AMERICAN MARBLE CUTTING COMPANY, OF BOSTON, MASSACHUSETTS.

IMPROVEMENT IN MACHINES FOR MOLDING AND SURFACING STONE.

Specification forming part of Letters Patent No. 213,828, dated April 1, 1879; application filed May 4, 1875.

*To all whom it may concern:*

Be it known that I, JAMES W. MALOY, of Somerville, county of Middlesex, and State of Massachusetts, have invented certain Improvements in Machines for Molding and Surfacing Stone and other Materials, of which the following is a specification:

My invention relates to that class of machines described in my Patents No. 53,845, dated April 10, 1866; No. 58,853, dated October 16, 1866; No. 61,220, dated January 15, 1867, and No. 70,449, dated November 5, 1867, which, though intended primarily for ornamenting slabs of marble, may, of course, be used upon any other material capable of being worked by such machines; and consists in certain improvements, fully described herein, upon the machines heretofore patented to me.

Figure 1:
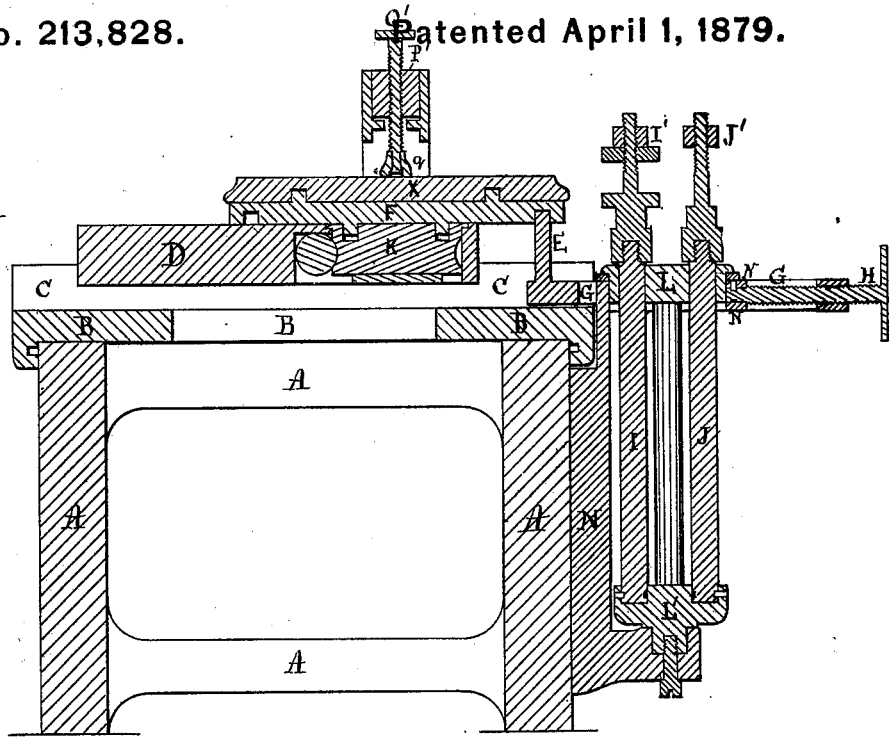
Figure 2:
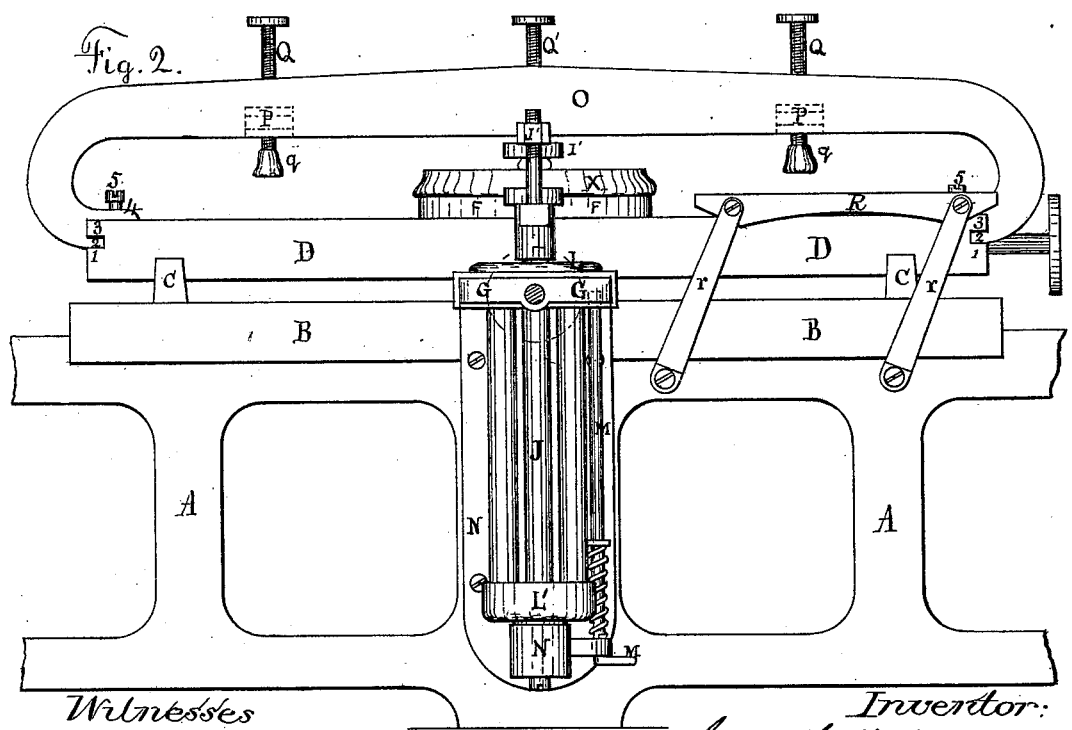

In the drawings, Figure 1 is a section, and Fig. 2 a front elevation. Fig. 3 is a plan.

Upon the framing A is mounted the slide B, so that it can be moved lengthwise upon the framing A. This slide B has ways C C crosswise upon it, upon which ways is mounted the slide D. To this slide D the form or pattern F is secured. This form F is controlled by the pin E, which is rigidly secured to the adjusting-slide G, which slide is mounted in ways which are rigidly secured to the bearings of the cutter-spindles. This adjusting-slide is controlled by the screw H.

The operation of this mechanism is as follows: After the slab or board X is secured in its place upon the form F, its edge is brought into proper relation with a proper cutter (mounted upon one of the spindles I or J) by means of the screw H, slide G, and pin E, which projects upward into a groove in the form or pattern F. This groove is used in order that the slab X may be moved positively both toward and from the cutter. The feeding mechanism then actuates the slide B, so as to carry its edge along past the cutter. This carries also the edge of the slide D along past the cutter; but the groove in the pattern-table F, acting upon the pin E, varies this motion by causing the pattern-table F and slide D to slide back and forth upon the ways C as the table D moves past the cutter, and consequently the edge of the slab is cut in exact conformity with the pattern.

Where it is desired that the edge of the slab shall vary from the pattern, the workman turns the screw H back or forth, as may be required, while the edge is cutting, thereby altering the relation of the pin E and the cutter from time to time, and consequently making the cut edge vary from the pattern. In this way an almost endless variety of edges may be formed upon the slabs without changing the pattern-table F, and a perfectly straight groove will answer for a large variety of curved work.

The feeding mechanism of the table B is of course under the control of the workman, as fully described in my former patents.

When one edge only is to be cut, the slab may rest directly upon the slide D, and the pattern be secured to the edge of the table D; but where the entire edge of the slab is to be cut, or where the cut is much in excess of one hundred and eighty degrees, the slab must be rotated. This is done by securing the pattern-table F to a rotating disk, K, let into the slide D. Here, in addition to the motions already described, the slab X has a rotary motion, and consequently in a great variety of work, such as ovals and other figures of a nearly circular outline, the slide B need not move at all; but, as will be obvious, the pattern used may be such as will require the slide B to be moved forward and back upon the framing A, in addition to the crosswise movement of the slide D and the rotary movement of the pattern-table F. When the pattern-table F revolves, the edge cut will conform exactly to the pattern-groove, as before, if the pin E be not altered in its relation to the cutter during the cutting; but when this pin is controlled during the cutting by the workman, the same unlimited varieties of cut may of course be obtained without altering the pattern.

This series of combinations constitutes the main feature of my invention: By the first—namely, the two slides, (one moving at right angles to the other,) the pattern, and the pattern-pin—the slab or board can be cut in exact conformity with the pattern; by the second—namely, the first with the addition of the means for constantly altering the relation of the pattern-pin and cutter—the slab or board can be cut to a pattern varying from the pattern used; by the third—namely the sliding table D, the rotating pattern-table, and the pattern-pin—the slab or board can be cut all around in exact conformity to the pattern; by the fourth—namely, the third with the addition of the means for altering the relation of the pattern-pin and cutter—a small pattern may be used to produce a variety of figures, each conforming to the pattern exactly, but each different in size, and when the means for altering this relation of the pattern-pin and cutter are capable of use while cutting, a single pattern will answer for a great variety of figures, each varying from the pattern not only in size, but in outline; and by the fifth—namely, the two slides, (one moving at right angles to the other,) the rotating pattern-table, and the pattern-pin—the capacity of the machine is still further increased, especially when the pattern-pin is controlled in its relation to the cutter by the workman during the cutting.

The next feature of my invention relates to means for preventing a roughness of cut which arises from the condition of the material. For example, it frequently happens that if the cutter cut from the left toward the right in a slab of marble the cut will be rough, small pieces being broken off, while had the same cut been made from the right toward the left it would have been smooth, (this being also familiar in wood;) and this part of my invention consists in the combination, with a right-and-left cutter, of suitable means for bringing either into operation. The cutter-heads I' and J' are secured to the spindles I and J by means of screws, one being a right-hand screw and the other a left-hand screw, in order that the resistance of the material may tend to tighten rather than loosen the cutter-heads on the spindles. One of these cutters revolves from right to left, the other from left to right, and consequently one of them requires the material to be moved from left to right, the other from right to left. The bearings of the cutter-spindles I J are formed in the disks L L', which are rigidly connected together, and so mounted that they can be revolved far enough to bring either into operation. The upper disk is locked in its place by the spring-catch M. The bearings for the disks are formed in the casting N.

In practice I usually so mount the cutter-spindles that the cutters may be adjusted vertically, as shown in my Patent No. 53,845.

The next feature of my invention relates to clamping the material to be operated upon; and consists in the combination of the bridge-piece O with the table D, and the sliding nuts P, and the screws Q, and also in the combination of this bridge-piece, the central nut, P', and screw Q' with the swiveling pad $q$ and the revolving table F.

The bridge-piece O is commonly made adjustable, as shown by the parts marked 1 2 3 4, and is held in its place when adjusted by means of set-screws 5. The nuts P slide in ways formed in the bridge-piece, so that they may be brought nearer together or carried farther apart, in order to suit slabs of different lengths. The nut P' is fixed so that its axis is in line with the axis of the revolving table F. Its swiveling pad $q$ admits of the necessary movement of the material when clamped upon the table F.

The remaining feature of my invention consists in the combination of the gage R with the frame A and table B, by means of which the edge of the slab is properly adjusted. The gage is mounted upon the parallel rods $r\,r$, so that it can be lowered out of the way when not in use, and yet be horizontal when raised up.

What I claim as my invention is—

1. The combination of the slides B and D, the one supporting the other, the pattern or former F, and the pin E, substantially as described.

2. The combination of the slides B and D, the one supporting the other, the pattern or former F, the pin E, and the adjusting-slide G, substantially as described.

3. The combination of the slides B and D, the one supporting the other, and the revolving table F, substantially as described.

4. The combination of the right-and-left cutter-spindles I and J with disks L and L', substantially as and for the purpose specified.

5. The combination of the bridge-piece O, table D, sliding nuts P, and screws Q, substantially as described.

6. The combination of the bridge-piece O, the nuts P' and Q', swiveling pad $q$, and revolving table F, substantially as described.

7. The combination of the gage R, frame A, table D, and parallel rods $r\,r$, substantially as described.

JAMES W. MALOY.

Witnesses:
J. E. MAYNADIER,
J. E. KNOX.